(12) United States Patent
Dove et al.

(10) Patent No.: US 9,686,335 B2
(45) Date of Patent: Jun. 20, 2017

(54) SHARED DATA COMMUNICATION BANDWIDTHS AMONG MOBILE DEVICES

(71) Applicant: EchoStar UK Holdings Limited, Milton Keyes (GB)

(72) Inventors: Tony Dove, West Yorkshire (GB); Andrew Johnson, North Yorkshire (GB)

(73) Assignee: EchoStar UK Holdings Limited, Milton Keyes (GB)

( * ) Notice: Subject to any disclaimer, the term of this patent is extended or adjusted under 35 U.S.C. 154(b) by 341 days.

(21) Appl. No.: 13/835,940

(22) Filed: Mar. 15, 2013

(65) Prior Publication Data
US 2014/0280990 A1    Sep. 18, 2014

(51) Int. Cl.
  *G06F 15/16*    (2006.01)
  *H04L 29/06*    (2006.01)
  *H04L 29/08*    (2006.01)

(52) U.S. Cl.
  CPC ............ *H04L 65/601* (2013.01); *H04L 67/06* (2013.01); *H04L 69/14* (2013.01); *H04L 67/108* (2013.01); *H04L 67/1091* (2013.01)

(58) Field of Classification Search
  CPC ..... H04L 65/601; H04L 67/06; H04L 67/108; H04L 67/1091; H04L 69/14
  USPC ....... 709/202, 203, 217, 218, 219, 228, 229, 709/230, 231, 232, 234, 235
  See application file for complete search history.

(56) References Cited

U.S. PATENT DOCUMENTS

| | | | |
|---|---|---|---|
| 2002/0059400 A1* | 5/2002 | Ikami | H04L 29/06 709/219 |
| 2004/0209622 A1* | 10/2004 | Kotzin | H04W 88/06 455/452.1 |
| 2006/0234684 A1 | 10/2006 | Shin | |
| 2007/0037563 A1* | 2/2007 | Yang | H04L 67/104 455/418 |
| 2008/0299988 A1 | 12/2008 | Dawson et al. | |
| 2009/0046740 A1* | 2/2009 | Ruckart | H04W 28/18 370/468 |
| 2009/0054058 A1* | 2/2009 | Andreasson | H04W 4/18 455/426.1 |
| 2014/0122656 A1* | 5/2014 | Baldwin et al. | 709/219 |
| 2014/0207913 A1* | 7/2014 | Maddah-Ali et al. | 709/219 |

FOREIGN PATENT DOCUMENTS

WO    2009/024843 A1    2/2009

OTHER PUBLICATIONS

International Search Report, mailed May 22, 2014, for PCT/GB2014/050670, 12 pages.

* cited by examiner

*Primary Examiner* — Davoud Zand
(74) *Attorney, Agent, or Firm* — Seed IP Law Group LLP (57) ABSTRACT

Systems and methods are disclosed for connecting one or more mobile communication devices so that each device's data connections can be bundled to create a virtual connection to provide increased data communications bandwidth for one or more of the mobile communication devices to access applications and data on the Internet.

16 Claims, 8 Drawing Sheets

SHARED DATA COMMUNICATION BANDWIDTHS AMONG MOBILE DEVICES

BACKGROUND

Technical Field

The present disclosure relates to systems and methods to join multiple mobile communication devices together and to bundle the data communication bandwidths of each device together to increase bandwidth for receiving data by one of the devices.

Description of the Related Art

The ability to bundle multiple physical data connections to obtain a higher bandwidth "virtual" connection is known in the art with wire communications between a computer and a communications provider. For example, physical speed limitations of ISDN over a twisted-pair copper wire have been overcome by bundling multiple ISDN lines together. Typically, a circuit board adapter with multiple ISDN connections is installed in a computer, to which multiple ISDN lines are connected in parallel to a communication center. Software on the adapter divides the network stream more or less evenly among the multiple ISDN lines, where the divided data stream is reassembled in proper sequence at the communication center. The increase in bandwidth is approximately linear with the number of wires in the connection. However, this implementation uses wire connections with reliable bandwidth characteristics, special hardware to connect two pieces of equipment, and reasonably fixed locations for the equipment.

BRIEF SUMMARY

The present disclosure proposes systems and methods to bundle the data connections of one or more mobile communication devices. A preferred embodiment includes a plurality of mobile communication devices, each one having a first data communication link that is on an RF mobile communications network and a second data communication link that is part of a local communications path directly connected with another of the mobile communication devices of the plurality. A server is connected to the RF mobile communications network and sends data to each of the plurality of mobile communication devices. One of the mobile communications devices is designed as the destination device. The destination device receives a data stream that contains only a part of the total data needed for the full program. The other mobile devices receive other parts of the data stream needed for the full program. The data received by other mobile devices is transferred on a different communication link to the destination device within which it is assembled into the final program. The final program might be an executable software program, an entertainment video program, data that controls the operation of a complex machine, or other program content.

In one embodiment, each of the plurality of mobile communication devices contains a program that identifies the mobile communication devices that it is in direct communication with on a local communications path. It also identifies the source of data that is on a different communication path, such as an RF cellular network. Each of the plurality of mobile communication devices obtains data from the RF cellular network on their own, respective communication paths. One of them is designated as the destination device. The other mobile communications devices that are not the destination device transfer the data they have received over the local communication path to the destination device.

In one embodiment, a server is connected to the communications network and configured to send and receive data from the mobile communication devices. The server is also connected to a network that provides access to one or more resources over the Internet. A processing module on each mobile communication device is configured to identify those devices it is in direct communication with, receive a user request for a data communication resource, and send that request to the server. The server contains a processing module that receives a request from the mobile device, sends a request to and receives a response from the data resource, and divides the response into one or more parts and sends the parts on specific individual data connections to the mobile devices. The processing module on the mobile communication devices receives one or more parts of the response to the request for the data resource from the server, and the processing modules on the devices coordinate to reassemble the response and direct it to the destination device. The full data set is then made available to the user on the destination device.

The present embodiments therefore provide a way to join one or more mobile communication devices, such as Smartphones or Tablets, so that each device's data connection can be bundled to create a virtual connection that provides sufficient bandwidth for one or more of the devices to access applications and data that has more bandwidth than a single device alone has.

In one example, a group of people at an airport are trying to use their Smartphones to check in for a flight but each Smartphone has a data connection that has low bandwidth or a poor connection that is preventing any of them from accessing the airline's check-in application. By bundling their data connections and their individual bandwidth into a virtual connection, they would have the combined bandwidth for each person to check in for their flight.

Data communication bandwidth problems may be due to a number of factors such as an increased number of people talking, one party using nearly all the data on the phone carrier's network, data rate limitations of what each individual's device can receive, or limitations of what the cell tower can provide due to a large number of people using the network, dead spots, rainstorms, or other physical interference can thus be overcome by multiple devices bundling their bandwidth and sharing it with a single device of the set. Changes in data bandwidth may also be experienced when the data communication path is switched from a higher to a lower bandwidth tower, which may happen as frequently as every second. The present embodiment permits the rate at which data is sent to each mobile device to be varied to ensure that the full data set is delivered to the plurality of mobile devices, even though the amount of bandwidth used on each device may vary over time.

DETAILED DESCRIPTION

One or more users with mobile communication devices typically use these devices individually even if the device users are in close proximity to each other. The present disclosure is directed to systems and methods that allow two or more mobile communication device users to bundle the data communication bandwidth of each of their individual mobile communication devices into a virtual connection with higher bandwidth, and allow the results of access to data resources to be presented on one or more of the mobile devices.

This invention may be used in a number of ways. For example, a single family at an airport whose flight is delayed may want to allow their children to watch a streaming video to pass the time until the next flight. Within the family, it may be that four family members have a Smartphone. For example, the father has a Smartphone, the mother has a Smartphone and two of the children each have their own Smartphones. Even though the family has a number of Smartphones and tablets that would permit the children to watch streaming video on, the data connection rates and bandwidth on any individual mobile communication device may not be high enough to permit uninterrupted video streaming on any one device. By bundling the data connections and bandwidth on multiple Smartphones, the virtual data connection rate could be fast enough for the entire family to watch the video without interruption on a single Tablet or Smartphone.

In another example, a presenter during a sales presentation may find that Internet access needed to access the presentation on the cloud is either nonexistent or too slow. However, if the sales team members present at the meeting bundle the data connections used by their individual cell phones, they could provide sufficient Internet bandwidth for a successful presentation. Thus, all the sales members at the presentation will bundle their Internet connection bandwidth into a single virtual connection and transfer the data locally on a separate connection path so that all of the data needed for the successful presentation is available on a single one of their devices. In another example, people traveling in a car each have a mobile device connected to a different carrier. They are travelling along a route where the signal strength varies greatly between the different carriers, such as passing through a dead zone. By bundling the Internet connection of these devices, the occupants in the car can rely on a generally higher and more even data bandwidth rate than they could achieve by relying only on their individual phone's bandwidth. The data coming in can be pushed to a single phone using their combined bandwidths. In another example, three people are at an airport restaurant table trying to check in for a rescheduled flight using their Smartphone's Internet connection. When each tries to check-in, the bandwidth is so slow that it causes their connection to the airline website to drop. However, if the individuals' Smartphones were able to cooperate over a local network and bundle their data communication rates, the combined bandwidth would allow each person to check in for the flight using one mobile device, or allow the group to check in together.

In a preferred embodiment, one or more mobile communication devices would be able to connect with each other using a local network to share their Internet data connections. This local network may be implemented using Wi-Fi, infrared connection, NFC, Bluetooth, direct connection such as a USB cables, a USB through a hub, or other connection method.

Once the mobile communication devices are connected to each other in a local network, the mobile devices may communicate with the data source in different ways each using their own bandwidth. For example, if there are three mobile devices and all three mobile devices request the same information, each mobile device would broadcast the same request down its respective data communication channel. Whichever device receives a reply first, that device would then immediately broadcast the results to the other mobile devices over the local network.

In another embodiment, each of the mobile devices connected by the local network can access a server via the mobile devices data communication channel. The server would know the address and number of phones in the local network, and would split the information resulting from the query into parts and send each part down the independent data connection paths to each phone. When each part is received by the mobile devices, it would be sent to a destination mobile device where each part is reassembled in the correct order and presented.

In these and other embodiments the mobile devices may or may not use the same wireless carrier for data communication, and they may be using different network protocols, for example 3G, LTE, 4G, GPRS (general packet radio service) for 2G and 3G cellular communication systems global system for mobile communications (GSM).

Figure 1A:
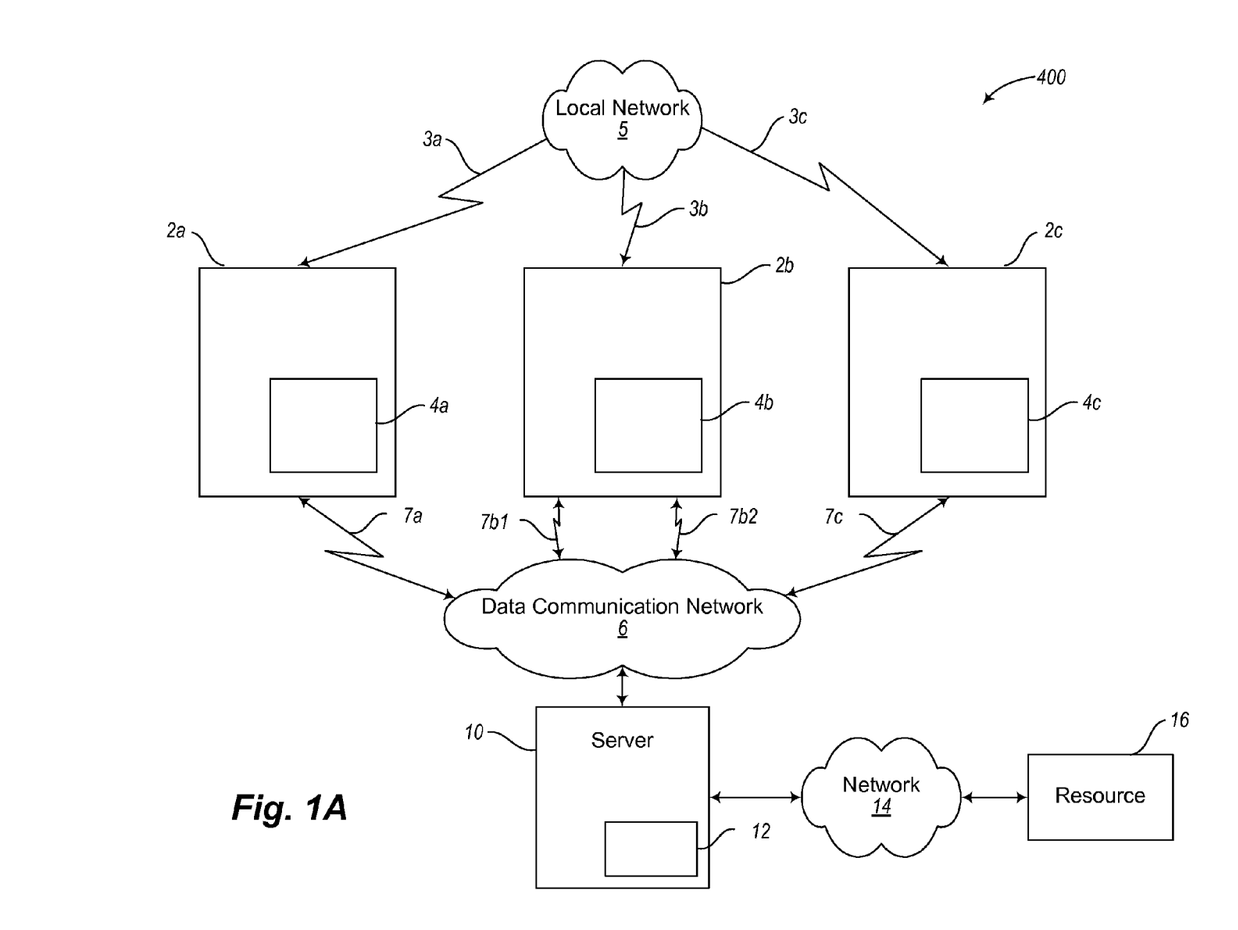
FIG. 1A is a block diagram showing three mobile communication devices connected to each other and to a server and to a data resource over a network in a first embodiment.

FIG. 1A shows diagram 400 which is an example of an embodiment of three mobile devices with bundled data connections. Smartphones 2a, 2b, 2c (generally refer to as 2 herein) are shown as three individual Smartphone and are each connected by their respective wireless data carrier to data communication network 6 by an RF communication 7. Smartphone 2a may have a 3G data connection 7a, Smartphone 2b may have two Internet connections, Wi-Fi connection 7b1 and 4G connections 7b2, and cell phone 2c may have a 4G connection 7c. The connections 7 between the Smartphones 2 and the data communication network 6 is a standard RF cellular communication link. The data communication network 6 would normally be composed of a plurality of cell towers with cell antennas that transfer information to and from the cell phones that are within their communication area. As the cell phones move to different locations, they would have stronger connections to different cell towers or different antennas which would all be considered part of the data communication network 6. The cellular communication link between a cell phone and the cellular data communication base system has a number of characteristics which may vary over time and between one mobile device and another. For example, the signal may be strong or weak depending on the positional relationship between the mobile phone and the particular antenna through which it is communicating. In addition, the data rate at which a particular mobile communication device 2 can receive data may vary from one communication device to another, depending both on the type of the device and the data plan that a particular device has. In addition, the quality of the connection may vary over time, for example, if there is a rain storm, a hail storm, or other interference in the local area one of the mobile phones may have significant problems in the data communication path 7 between itself and the data communication network 6. Some problems may also occur if on or more of the mobile phones is traveling at a high rate of speed, such as down the freeway, as it links from one call tower to the next, each of which may have different bandwidths at which it can provide data and also different timing at which they hand off the signal from one transmitting antenna to another in order to maintain a continuous flow of data information from the data communication network 6 to the individual mobile phone 2.

Each Smartphone is connected to the other Smartphone through local network 5. Local network 5 in some embodiments may be implemented using Wi-Fi, infrared, RF, Bluetooth, NFC, direct cable connection (e.g., a USB hub), or other connection method. Each Smartphone has an application module 4a, 4b, 4c, that in one or more embodiments allows the networked mobile communication devices to communicate with each other, allows a mobile communication device to send commands over the Smartphone's data communication channels, and allows the data communication channels to be queried to determine the bandwidth rate of that channel. In some embodiments, the application modules coordinate the data bundling and information retrieval from server 10 over data communication network 6.

In one embodiment, a server 10 is connected to the data communications network 6. The server 10 may have an application module 12 running thereon, the application module 12 providing the instructions and protocol to send the data on the appropriate data communication link 7a, 7b, 7c based on various factors as described herein in more detail. In some embodiments, the data resource to be obtained exists at the server 10 so that interaction between the server 10 and each of the mobile devices 2a-2c is sufficient to provide the requested data. In other embodiments, the server 10 may be coupled to a network 14 which has a data resource 16. The network 14 may be any one of any acceptable web-based connections, an Internet connection or other network that delivers data from a central resource. The central resource 16 may be a repository of data or programs, for example, a Netflix movie site, a company's financial database, a source of a program or instruction set at a particular server location which is distant from the mobile devices 2a-2c or any other source of the data to be provided.

The term "data," as used herein in connection with the various devices such as a data communication and a data resource, refers to the transmission of information which may take any form such as an instruction set to be executed at one of the mobile devices, a program for the computer, a video stream of streaming video files, an audio file or other type of transfer of information stored in a computer format. Thus, the term "data" as used herein is intended to include electronic files of any type. In one or more embodiments, server 10 will calculate and track the bandwidths for each of the data communication channels 7 connecting the one or more mobile devices 2, send requests received from the one or more mobile devices 2 for a data resource 16 over network 14, receive the response from the resource 16, divide the response into individual parts that are sent in parallel over data communication network 6 to the individual mobile communication devices where the response is reassembled and routed to the appropriate mobile device by the local network 5.

The bandwidth of data communication channels 7a, 7b1, 7b2, and 7c can be calculated a number of different ways, including but not limited to applications running on the one or more mobile devices or by the application running on the server 10. For example, an application can perform periodic speed tests by periodically sending test data down each data channel and measure its return rate. Another example is to divide parts of the result of a request to an Internet resource evenly and measure the actual time it takes for each part to travel down its respective data channel. Individual bandwidth figures can then be adjusted and applied the next time parts of the result are sent down the data channels, with adjustments to the bandwidth figures made each time data is sent to the mobile devices 2.

The embodiments as described herein take advantage of differential bandwidths and communication ability that an individual mobile device 2 may have depending on the network that is communication with or through. For example, an individual's mobile device 2, such as a cell phone, generally has a data plan and a bandwidth with which it can communicate to the cellular network 6. This is usually based on the type of cell phone, whether 3G, 4G, or LTE, and also the amount of money that the user is paying for their data plan. Each data plan may have different limitations with respect to the speed of the connection, the quality of the connection, and the type of connection which are usually controlled by the cellular communication provider, which may be T-Mobile, Verizon Wireless, AT&T Mobile, GTE, or any of the many mobile communication networks that provide cellular transmission form towers to individual cell phones 2. In addition, each cell phone 2 contains a local antenna and communication capability which is based more on the cell phone's technology and is not limited by a data plan, a monthly subscriber service or communication with one of the major carriers, such as AT&T, T-Mobile, Verizon Wireless or the like. These local communication paths, designated 3 generically herein and considered part of local network 5, include techniques by which the mobile device may communicate at a very different speed and using a different bandwidth with other cell phones, tablets, electronic systems and the like that are local to that cell phone. As shown and described in more detail in FIG. 3, each mobile device 2 will contain a Bluetooth antenna and communication system which permits it to communicate at a high data rate and a large bandwidth with devices that are within a few dozen feet of it. In addition, many cell phones 2 include an infrared communication link with which it can communicate with other electronic devices to exchange large amounts of data a very high rate with virtually unlimited bandwidth. An NFC communication also permits a very high rate of transfer of large amounts of data with a very large bandwidth as do direct cable communications, USB ports through a USB hub and other communication techniques which may be part of the local network 5. A cell phone 2 is able to communicate simultaneously using two different communication links. For example, it can be coupled via connection 7 to a cellular communication network 6 and receiver data, such as streaming video, voice conversations, instruction sets, programming data and the like, and at the same time can be communication via a local connection 3 to a Bluetooth headset, an automobile, another mobile device or the like. Generally, the rate at which data can be exchanged over the local network 5 via the local communications 3 is a high rate with very large bandwidth capabilities and, in some instances, virtually unlimited bandwidth and at no additional charge to the owner of the cell phone 2.

One principle of the present embodiments described herein is that the data contained at the server 10 is to be communicated to a destination mobile device 2 which is one of the mobile devices that is coupled to the local network 5. The amount of data to be transmitted and the rate at which it is to be transmitted exceeds the bandwidth of any one of the mobile devices 2. Accordingly, the server divides the data into two or more different streams, and in the example shown in FIG. 1A, three different streams. A portion of the data is sent to the first mobile device 2a, a next portion of the data is sent to a mobile device 2b, and another portion of the data is sent to the mobile device 2c. In this instance, the destination mobile device may be any one of the mobile devices 2a, 2b, or 2c. Once a destination mobile device has been selected and agreed upon, then the other two mobile device use the separate communication link to send that portion of the data which is the overall data set to the destination mobile device 2. The destination mobile device receives that portion of the data stream which it is missing from the other two mobile devices, combines them within its own processor into a single data set and presents the fully assembled data. The presentation may take the form of a streaming video, such as watching a movie, the downloading of complex accounting data, an instruction set to program a computer or one or more of the mobile devices 2 or any other form.

In the example shown in FIG. 1A, a local network 5 is established and one of the mobile devices 2 is selected as a destination device. The data is transmitted on the first network link 7 to the three mobile devices in different packets and amounts, depending on their available bandwidth, the strength of the signal connections and other considerations, and then immediately, or as quickly as possible, is transferred to the destination device so that as far as the destination device is concerned, it is simultaneously receiving all of the data. One part of the data comes to the destination device directly from the data communication network 6 and the other parts of the data come at virtually the same time from the other two mobile devices which are in the network. This is because the speed of the link 3 between the mobile devices 2 and the local network 3 is extremely fast and has nearly unlimited bandwidth as compared to the rate of data transfer in communication link 7 between the data communication network 6 and the mobile devices 2. Accordingly, the destination mobile device 2 sees the entire data stream coming as a single completed data set, but from two different communication links, a portion of the data coming on communication link 7 and another portion of the data coming on communication link 3, and it combines the data coming from both the communication links 7 and 3 into a single unified data file which it then presents.

Figure 1B:
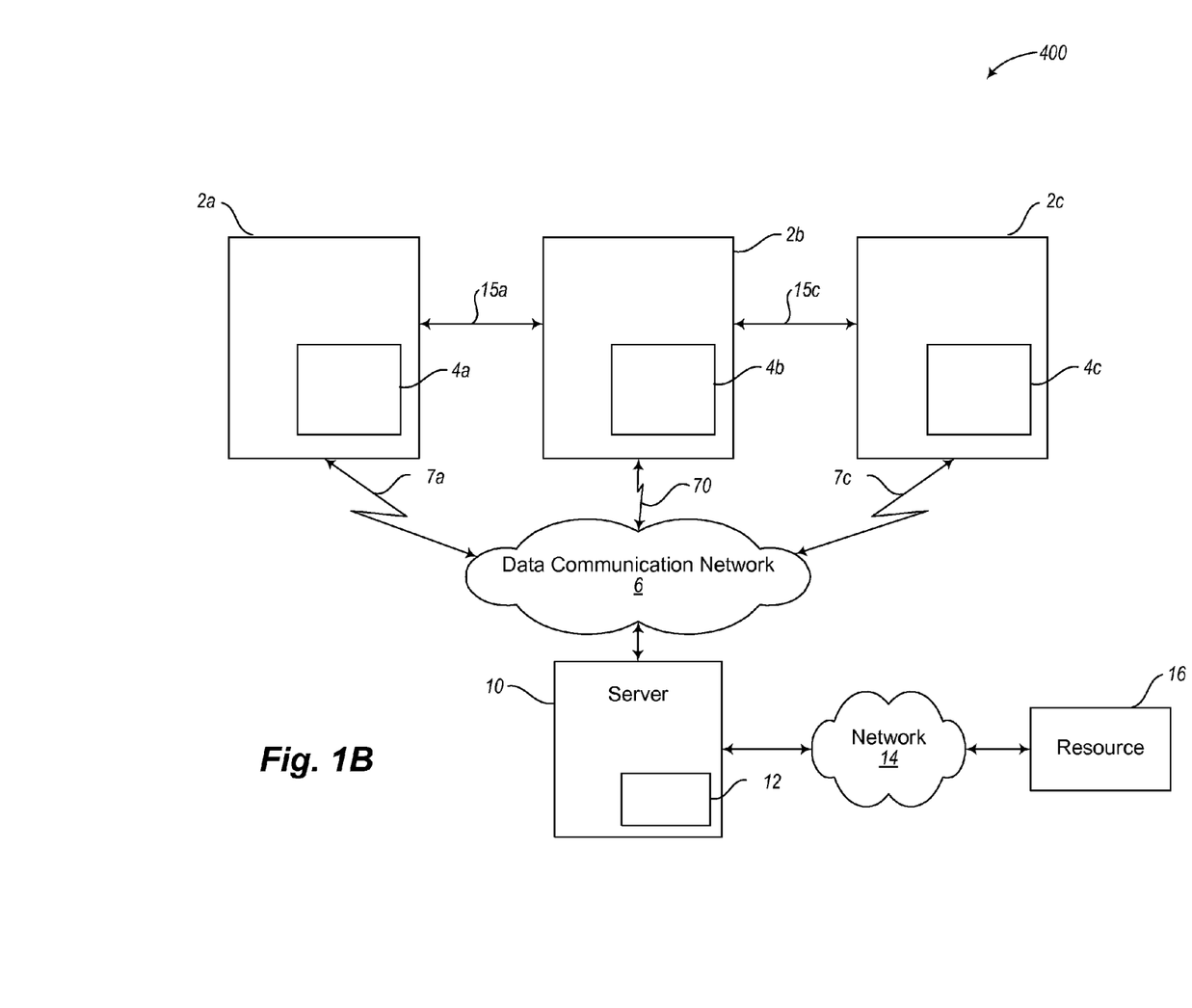
FIG. 1B is a block diagram showing three mobile communication devices connected to a server and to a data resource over a network according to a second embodiment.

FIG. 1B is a modification of FIG. 1A as will now be explained. In the embodiment of FIG. 1B, one of the mobile devices, in this example 2b, is previously designated as the controller mobile device and is the destination device. This controller mobile device 2b is designated to receive communication through local communication links 15a, 15c from the other two mobile devices 2a, 2c. No local network is created nor is one needed. Instead, device 2a will beam, from one of its local communication links, an amount of data to device 2b on communication link 15a. This communication link may be any communication link which 2a and 2b share together, which may include such possible communication links as Bluetooth, NFC, Infrared, direct cable connection or other connection method. This is a straight transfer of data from 2a to 2b along communication link 15a. A similar communication link is carried out between mobile device 2c and the destination device 2b. The communication link 15c can also be any one of the available communication links which is compatible between mobile phone 2C and mobile phone 2B and does not need to be the same type of link as that use for link 15a. It may also be an Infrared, Wi-Fi, Bluetooth, NFC, direct cable connection, or any of the acceptable devices. It does not need to know the type of data connection between made at link 15a nor, in fact, even that mobile device 2a is providing data. It merely knows that it is receiving some data on channel 7c and is immediately passing that data as quickly possible on another data channel 15c to a destination mobile phone 2b which is acting as the controller mobile phone.

The controller mobile phone 2b connects to the data communication network 6 via communication channel 7b.

One example in which the three mobile phones 2a, 2b, 2c may communicate with each other and with the data communication network is provided referring to the embodiment of FIG. 1B as an example. In this particular embodiment, three people who have mobile devices 2a, 2b, 2c wish to watch a live streaming video of an important football game, such as the Super Bowl. The three of them are at a distant location, for example, North Dakota working on an oil rig. Since there are no local TVs at the oil rig by which they can watch the Super Bowl, each of them wishes to watch the Super Bowl on their mobile communication device 2. Unfortunately, the bandwidth that each of them has for communication to the data communication network 6, which may include the contract they have with their cellular provider, does not have sufficient bandwidth that any one of them can watch the Super Bowl live as streaming video. However, if they were to combine the bandwidths and communication availability 7a, 7b, 7c, the combined bandwidth of each of these three is sufficient to watch a live streaming video of the Super Bowl. Accordingly, one of the devices, likely the one having the largest screen and the sharpest picture, is selected as the destination device on which all the users will view the Super Bowl, in this example mobile device 2b. Mobile device 2b is therefore set up as the destination device and is the controller of the communication links.

After mobile device 2b has been established as the destination device and as the controller, it will send a signal over one of the local area communication links 15a and 15c or, in the example of FIG. 1A, over local network 5 over signals 3a, 3c, to determine any mobile devices that are within its same local area with which it can share data at a high rate of speed and have a large bandwidth. It may identify three, seven, or dozens of mobile devices with which it can share a very high local communication link 15*a* that has little to no interference. Over this local communication link 15*a*, it will communicate to the other devices 2*a*, 2*c*, in the example shown it locates two such devices with which to set up a combined bandwidth. Over the link 15*a*, the controller 2*b* learns what bandwidth each of them has for communication to the data communication network 6. It may use a number of techniques to query the bandwidth, the quality of the signal and the data rate of each of the other devices 2*a*, 2*c*, including sending test signals, checking its storage for the data plan and other techniques. It also learns the addresses, phone numbers, and other communication details in order to communicate with each of the devices 2*a*, 2*c*.

After having obtained this information about each of the mobile devices 2*a*, 2*c*, which is to be included in the local communication of data, it sends all of this data on a single link 70 to the data communication network 6 which sends it to a server 10. The signal sent along data communication path 7*b* therefore includes the cellular network addresses, phone numbers, and other communication details to permit the server 10 to communicate and send data to each of the devices 2*a*, 2*b*, 2*c*. The server then links to the data either as stored in itself or obtained from the network 14 and begins to transmit the data to each of the three devices 2*a*, 2*b*, 2*c*. It may place a phone call to devices 2*a*, 2*c* in order to begin to establish the communication link. Thus, in this particular embodiment, the communication begins by a controller 2*b* acting as the destination device obtaining address and communication information over a local link 15*a*, 15*c* and, having obtained that, sends that contact information over single central cellular communication link 7*b*.

The users of mobile devices 2*a*, 2*c* do nothing but place their mobile devices in close enough proximity to mobile device 2*b* so that they can continue to maintain a strong communication links over lines 15*a*, 15*c*. After the request to start the transmission of data over three different lines is sent to the server 10, the internal application 12 obtains access to the data source. The internal application 12 recognizes that the data is being requested to be sent in three different portions to three different devices and then, once received by the three different devices, will be sent to a central location where all the data is assembled again into a single data file. Accordingly, the server application 12 takes the original data stream, which in this case is the NFL Super Bowl, as a live video feed of streaming data and parses it into three different data segments, no one of which alone is sufficient to make a live data signal, but each one of which contains a portion of the live data signal. A first portion of that is transmitted over communication line 7*a*, a second portion is communicated over line 7*b* and a third portion over line 7*c*. The amount of data sent over each of the portions 7*a*, 7*b*, 7*c* does not need to be equal.

In some embodiments, of course, a third of the data is sent over each of the three signals. However, it may be that one of the mobile communication devices 2*a* has a very high data rate and a strong connection to the data communication 6. This information is transmitted to the server application 12 which allocates the communication link 7*a* to have a larger portion of the total signal, for example, it may contain 60% of the total data being transmitted in the data file and the remaining 40% is split with approximately 25% going to mobile device 2*b* and 15% going to mobile device 2*c*. Thus, in this example, the server 12 provides a significantly larger portion of the data file to one of the mobile devices which may, or may not, be the destination devices, since the selection will depend on the bandwidth, strength of the signal, and the quality of the communication between data communication network 6 and the mobile device along communication path 7. Even though no one of the devices has sufficient bandwidth on path 7 to receive the full data stream of the NFL Super Bowl live, each of them, by combining their bandwidths is able to receive enough of it which would then be transmitted over 15*a* and 15*c* to the destination device 2*b* which will combine all of the video stream into a single video stream using its mobile application 4*b* and present it on a viewer display.

Alternatively, of course, the central controller 2*b* may transmit the final assembled to a large screen TV via yet a third communication links, such as Infrared TV signals. For example, the central controller 2*b* may have the mobile application 4*b* operating thereon which acts as a destination devices and a controller which receives all of the data streams from the associated mobile devices 2*a*, 2*c*, combines them into a single data file and then for presentation purposes outputs the data file on yet another mobile communication link, such as an NFC, a cable, or other way in which it is coupled to a very large video presentation device. Thus, the central controller 2*b* does not necessarily have to be the presentation device on which the combined data is finally presented. Accordingly, it would be possible to combine three or four cell phones together, plug one of the cell phones via a cable into a large screen TV and, using the combined bandwidth of the three or four cell phones, watch the Super Bowl live as streaming data over a large screen TV while working in North Dakota on an oil rig.

FIGS. 2A through 2E show different embodiments describing the functions and relationships between applications on the mobile devices and applications on the server.

Figure 2A:
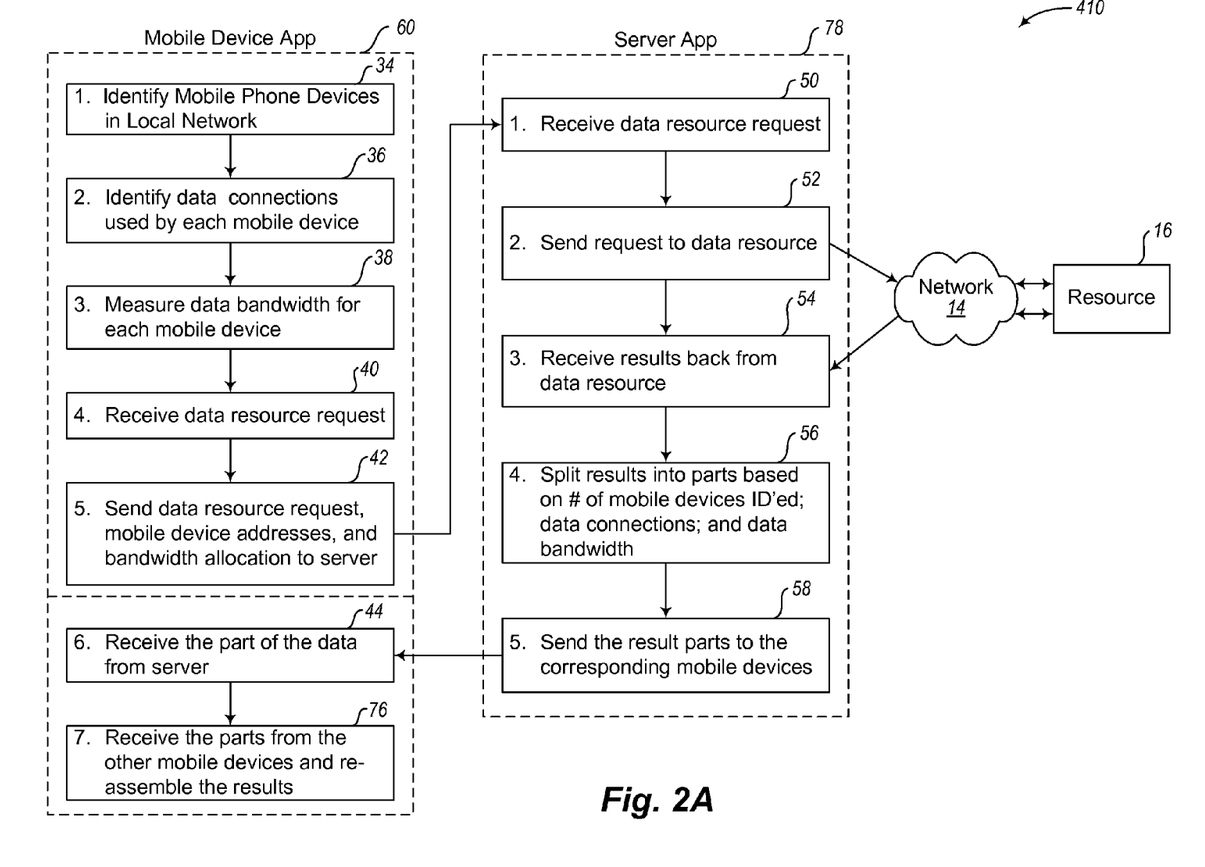
FIG. 2A shows an embodiment in which one of the mobile devices acts as a controller and the method steps for the controller mobile communication device application are shown, with the server application, in which multiple mobile communication devices coordinate in a single controller configuration and the mobile communication device measures data communication bandwidth.

FIG. 2A shows diagram 410 which is an embodiment of method steps for a mobile device application 60 and a server application 78, where the one or more mobile devices 2 are structured in a single controller relationship, where one mobile device 2 is designated as the controller that issues requests to a resource, and the other non-controller mobile devices obtain a part of the data file and forward any result parts received from server 10 to the mobile device controller. The example shown for FIG. 2A is for the destination mobile device, such as 2*b* of FIG. 1B. Within the mobile device application 32, the first step is to identify mobile phone devices in the local network 5 in the Identify Mobile Phone Devices in Local Network step 34. In one or more embodiments, this may be accomplished by searching for nearby devices using Wi-Fi, infrared, RF, or Bluetooth technology. The application may be configured to automatically connect with any discovered mobile communication devices, or prompt the user of the device to ask to join the network. In some embodiments, devices may be hidden from this identification step. The second step of the mobile device app is to Identify Data Connections Used by Each Mobile Device 36. In some embodiments, a mobile device may have no data connection, or may have one or more data connections. In some embodiments each mobile device is aware of all data connections and can identify those connections to the server 10 to return the data result parts. In some embodiments, the third step of the mobile device application is to Measure Data Bandwidth for Each Mobile Device 38. There are a number of different ways to measure data bandwidth, some of which are described above. This data bandwidth information may be used by a mobile device application when it is sending a request to server 10 to tell the server the size of each result part and the data connection the server should send it down. The fourth step is the receive Data Resource Request 40. In some embodiments this is a request from a user to access a website, for example access to an airline website to check in for a flight, or access to a video streaming service to watch a movie. The next step is to send the Data Resource Request 40, mobile device addresses, and bandwidth allocation to the server step 42. In some embodiments this step sends the request down each of the mobile devices data channel to the server 10, and in other embodiments the mobile device may send the request to another mobile device connected to local network 5 and the request for all mobile devices 2 are sent down that a single device's data channel to server 10.

At the server application 78, the server 10 as a first step receives the Data Resource Request 40, and as a second step performs a Send Internet Resource request 52 to the Internet resource 16 over network 14. In a third step the server receives results of the request 54, for example the HTML string of an airlines website, or packets from a video streaming service. In the fourth step 56, the server splits the results into result parts based on the number of mobile devices identified, data connections to the mobile devices 2, and bandwidth of the connections 7 which it received from the mobile device application 42. Then in final step 58, it sends the result parts to the corresponding mobile devices 2 by sending each result part on its corresponding data connection 7. The mobile device app 60 then as a next step Receives the Part of the Results from the Server 44, and then performs the Send those Results over local network 5 via links 3 or a direct communication link 15 to the Appropriate Mobile Device step 76. In one embodiment, steps 44 and 76 represent steps of a mobile device that is in controller mode, as the destination device where the application that will be the destination receives a part of the results from the server itself. It also receives results from the appropriate mobile device 2. In some embodiments, a non-controller device would always send the parts it receives to the controller mobile device. In other embodiments, the data part received from the server may designate the specific mobile device that the part should be sent to. The destination device, which is 2b of FIG. 1B, will receive some parts from the server, step 44, and receiver other parts from the other mobile devices, step 76. The destination device combines all parts to obtain the full original data file in the correct sequence.

Figure 2B:
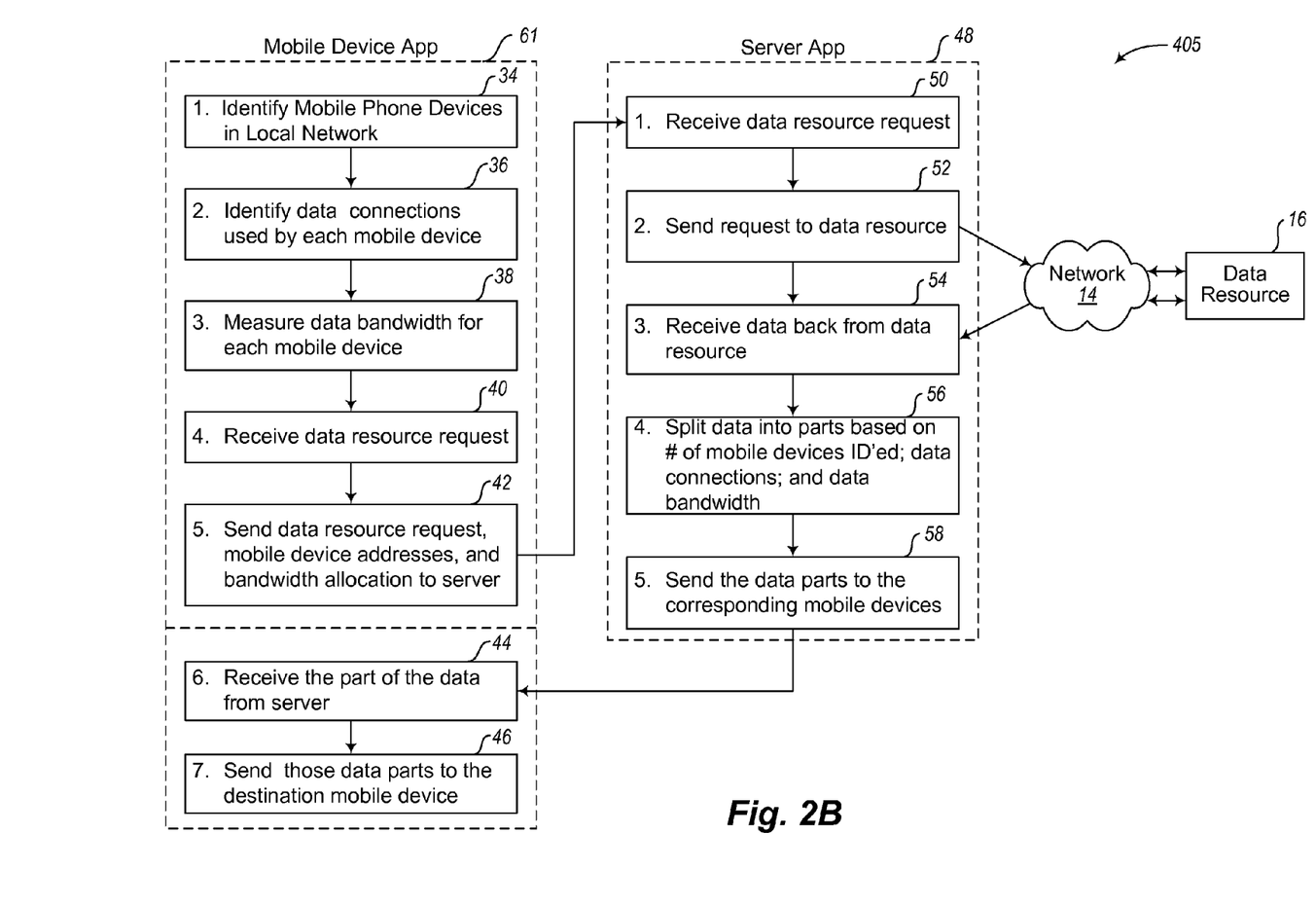
FIG. 2B shows an embodiment in which one of the mobile devices acts as a controller and the method steps for the non-controller mobile communication device application are shown, with the server application, in which a mobile communication device application and a server application, where the multiple mobile communication devices coordinate in a single controller relationship and the mobile device measures data communication bandwidth.

FIG. 2B shows diagram 405 which is an embodiment of method steps for a mobile device application 61 and the server application 48 which one or more mobile devices are structured in a single controller relationship. FIG. 2B differs from FIG. 2A in that the mobile device application 61 in this embodiment is one of the mobile divides 2 that is not the final destination. After the mobile device app performs the Receives the Part of the Results from Server step 44, the mobile device application will then perform the Send the data Parts to the Other Mobile Device step 46 where it will Reassemble the Results step 76 of FIG. 2A. The other non-controller mobile devices will forward their received result parts to the controller. Once all parts are received and reassembled by the controller, the result will be displayed to the user.

Figure 2C:
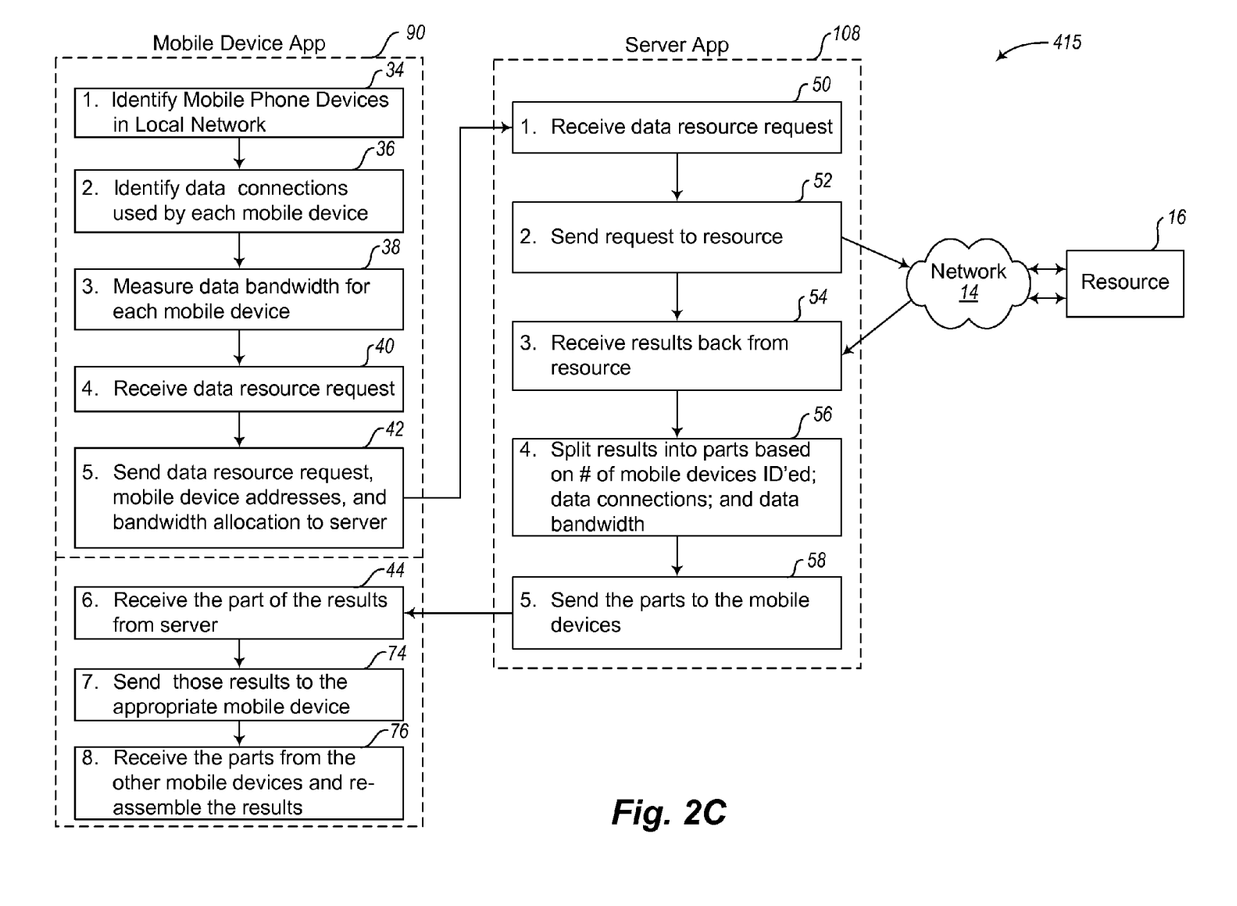
FIG. 2C shows an embodiment of method steps for a mobile communication device application and a server application, where the multiple mobile communication devices coordinate in a peer relationship, and where the mobile communication device measures data communication bandwidth.

FIG. 2C shows diagram 415 which is an embodiment of method steps for a mobile device application 90 and a server application 108, where one or more mobile devices are structured in a peer relationship, where any result parts received from server 10 will be sent by the receiving mobile device to the mobile device to which the part is destined. FIG. 2C differs from FIGS. 2A and 2B in that the mobile device application 90 in this embodiment is a peer with equal status among the other mobile devices. When the mobile device application performs the Receives the Part of the Results from the Server step 44 by receiving a result part from the server 10, the application will check if the result part is destined for a different mobile device, and then perform the Send those Results to the Appropriate Mobile Device step 74 if it is. If the result part is destined for the mobile device receiving the result part, then the mobile device application 90 will perform the Receive the Parts from the Other Mobile Devices and Reassemble the Results step 76. In the peer configuration, the server 10 does not know which mobile device 2 is the controller or destination device, whereas in the embodiments of FIGS. 2A and 2B, it knows. The server 10 sends the data on the various different links 7 and the remote devices 2, after comparing internal processing power and bandwidth, determine which among them will be the destination device.

Figure 2D:
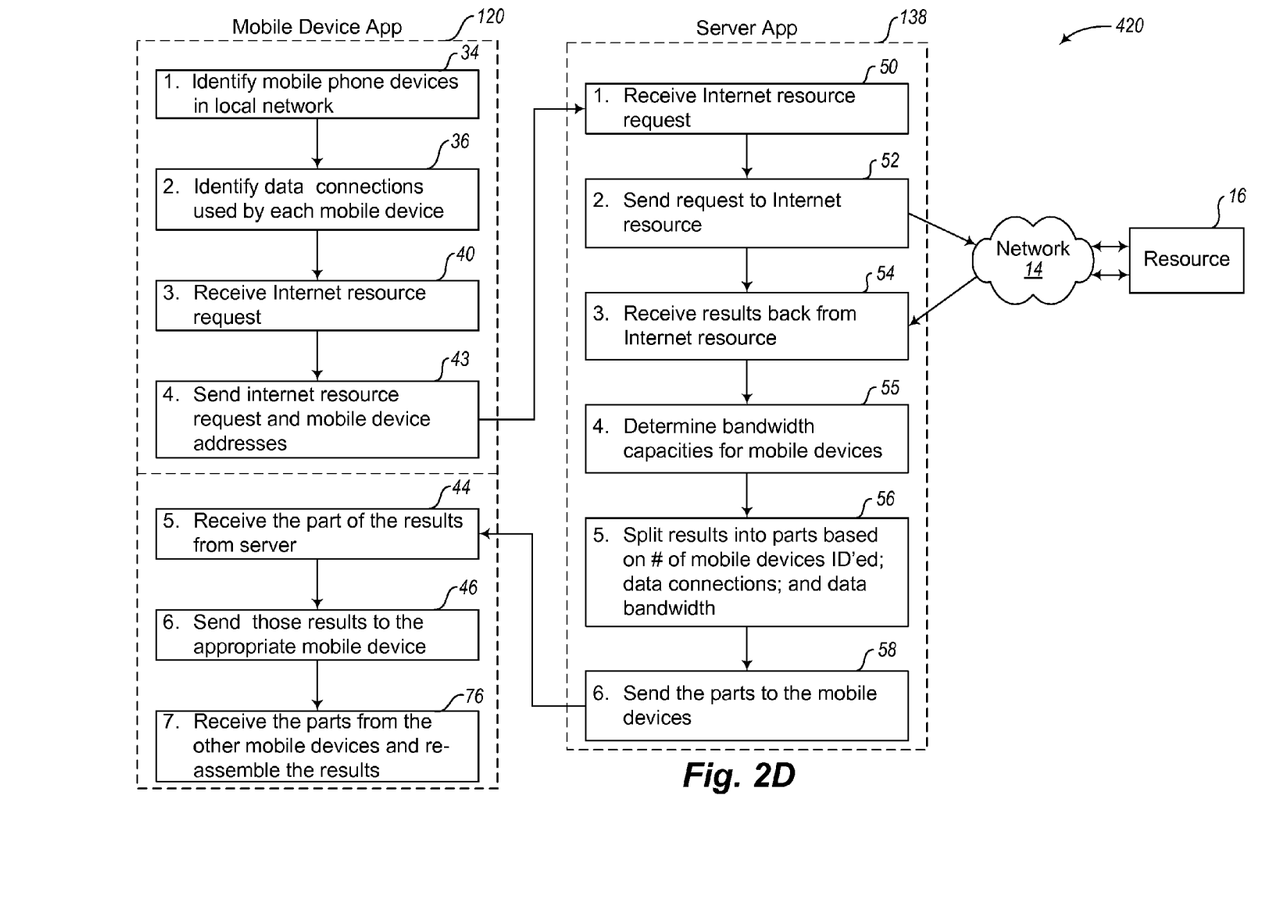
FIG. 2D shows an embodiment of method steps for a mobile communication device application and a server application, where the server measures data communication bandwidth for each mobile communication device.

FIG. 2D shows diagram 420 which is an embodiment of method steps for a mobile device application 120 and a server application 138, where the one or more devices are structured in a peer relationship, and where the bandwidth for the data connection for each mobile device is calculated on the server application 138. FIG. 2D differs from FIG. 2C in that step 55 is added to server application 138 to Determine Bandwidth Capacities for Mobile Devices step 55. There are a number of ways that step 55 can determine bandwidth, including having the server periodically sending test data and measuring throughput for each data channel of each mobile communication device.

Figure 2E:
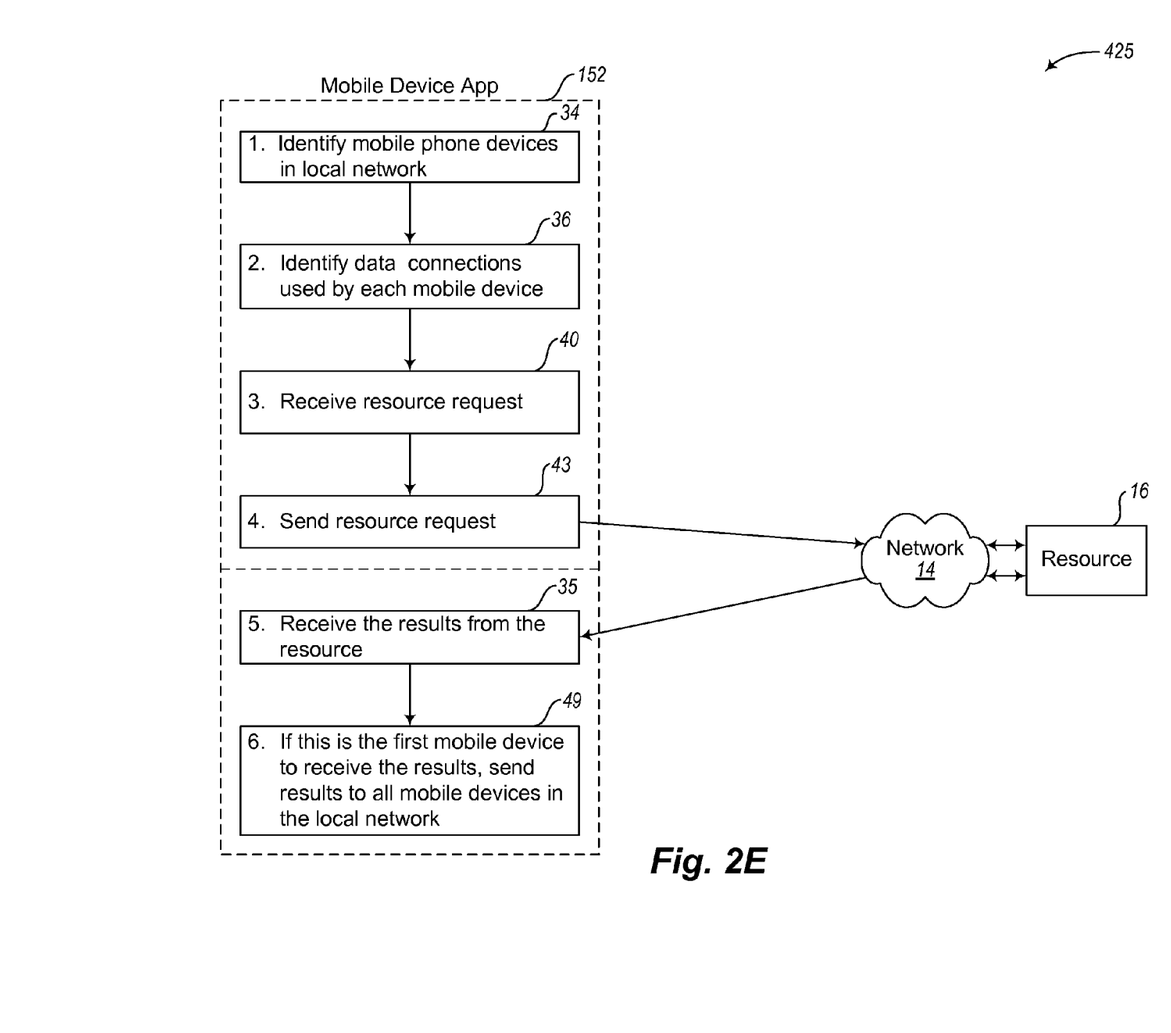
FIG. 2E shows an embodiment of method steps for mobile communication device application where each device requests the same Internet resource, data communication bandwidth is not measured, each mobile communication device contacts the Internet resource directly, and the first mobile device to receive a reply broadcasts the reply to all mobile communication devices.

FIG. 2E shows diagram 425 which is an embodiment of method steps for a mobile device application 152, in which each of the applications is not communicating with server 10, but rather is communicating directly with resource 16. This can be referred to as a "Racehorse" configuration. In this embodiment, the "Receive resource request" 40 receives a request from one of the mobile devices, and sends that request to all of the mobile device applications that are part of a local network 5. At that point, each mobile device application 152 will execute the Send Resource Request step 43 to the resource 16, each using their own device's data communication connection. The results from the resource request will be returned down each mobile device's data channel, and each mobile device application will perform the Receive the Results from the Resource step 35. The mobile device application will then check to see if it is the first one to receive these results by performing step 49. If it is, the mobile device will send the results to all the other mobile devices using the local network 5.

In the embodiment of FIG. 2E, each of the mobile devices 2 is attempting to obtain the entire data file as quickly as they can. It might be that the actual bandwidth of the connections changes so quickly with respect to one mobile device that it is difficult to predict its full bandwidth and the quality of its data connections. Alternatively, each of the mobile devices may be seen as having sufficient that, given enough time, all the data can be transferred. Accordingly, each of the local mobile devices 2 identify themselves as being adjacent to each other in step 34. In step 36, the second types of data connections, whether NFC, Bluetooth, Wi-Fi are the like are identified between the local phone devices 2. Then, at approximately the same time, each of the mobile phone devices makes a request for the data for the data resource file in step 40. In the diagram shown in FIG. 2E, the request is shown going directly to a network 14 which may be an Internet service or some other local area network. Of course, in most embodiments the request will go through an RF cellular communication link 7 and through a mobile communication network 6 of the type shown in FIG. 1A and, therefore, the mobile communication network 6 may be substituted 6 in place of the network 14 or, in addition to, in a series connection. In this particular embodiment, a server which includes a server app 12 in order to reallocate the bandwidth to each of the mobile devices prior to being transmitted over the communication network is not necessary. Each of the mobile devices is trying to obtain the entire data file as quickly as they can. Once one of the mobile devices has obtained the data file or a part of it, it transmits the entire data file by the second data connection 15, or in the example of FIG. 1A, network 5 via connections 3, to all of the other mobile data devices so that they now immediately have the data file. Thus, in the racehorse configuration, all of the mobile devices 2 which are associated with each other receive the entire data file as quickly as any one of them in the set receives the entire data file. The software is saved and it is not necessary for operating on the server side to parse out and organize the data for sending portions of it simultaneously to a plurality of mobile devices.

Figure 3:
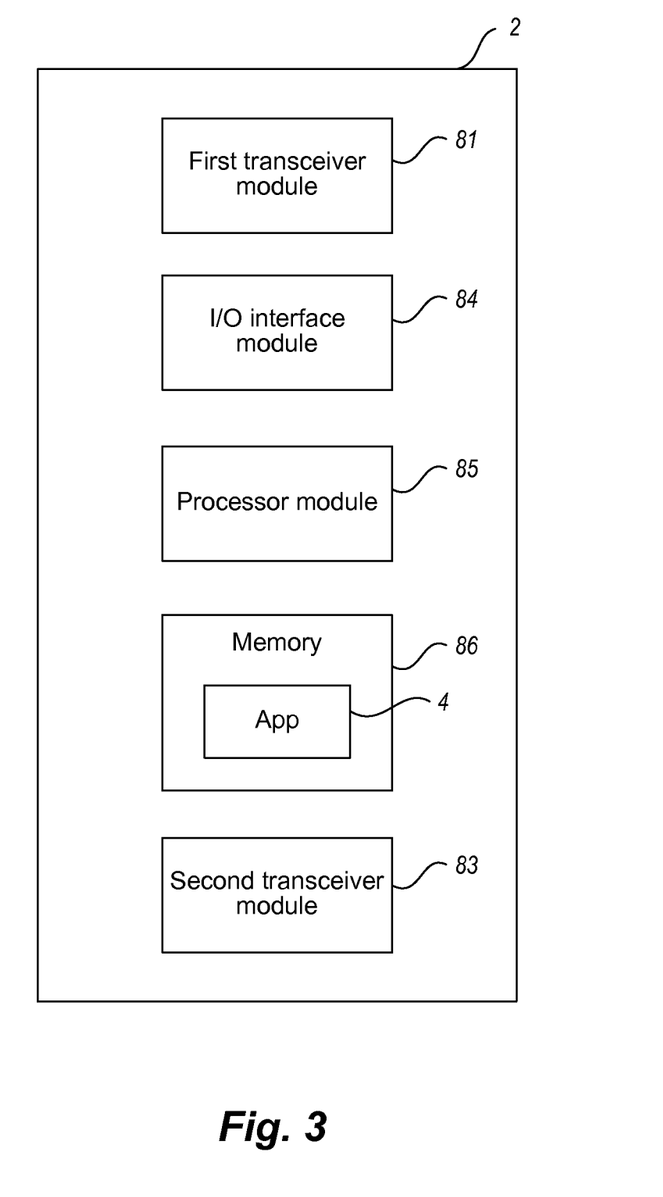
FIG. 3 shows an example of a mobile communication device structured for use in embodiments of the present invention.

FIG. 3 illustrates one example of a mobile device 2 which may used in the various embodiments of the present disclosure. The mobile device 2 contains two modules by which it can communicate with other devices. A first transceiver module 81 contains the antennas, output drivers, and radio communication link to communicate with the cellular network using a standard RF transmission type. This would be the standard cellular communication of a type well known in the art, such as 2G, 3G, 4G/LTE or other cellular communication network. Also within the mobile device 2 is a second transmit and receiver module 83. This second transceiver module 83 transmits over much shorter distances, has a different bandwidth and a different type of communication protocol than used for the first transmit and receive module 81. The second transceiver module 83 may be any one of a number of acceptable local transmission protocols such as NFC, Bluetooth, Wi-Fi, Infrared, USB cable or the like. Most mobile devices 2 will include at least three or four different types of second transceiver modules 83. Namely, most of them will include a transceiver module. In addition, most will also include an NFC transceiver module. In addition, most will include the capability to connect to a USB port, such as a mini USB on which it may receiver both power and data. These second transceiver modules 83 are of the type which can transmit large amounts of data over a very short distance and generally have large bandwidth and huge data transfer rates. The mobile device 2, therefore, has at least two transceiver modules which can operate independently of each other to transmit and receive data.

Using the techniques as described herein, the first transceiver module 81 will receive a first portion of the full data set. The transceiver module 81 is coupled to a processor module 85 either directly or via an I/O interface 84. The instruction sent for driving the processor module 85 is stored in the mobile app 4 as indicated in FIG. 3 and also FIGS. 1A and 1B. The mobile app 4 is generally stored in a memory 86 that is often separate from the processor module 85 but it also may be integral to the processor module 85. The data received on the first transceiver module 81 is transferred via the processor 85 to the memory 86 under the instructions of the mobile app 4. In addition, the mobile app 4 also interacts with the second transceiver module 83 to either immediately send the same data set that was received on the first transceiver module 81 as an output to the second transceiver module 83. This would be the case in which the mobile phone 2 is acting as a non-controller mobile phone 2 or as a pure mobile phone. Thus, the task of the processor module 85 would be to simply take the data that was received at the first transceiver 81 and transmit it as fast as it can as an output on the second transceiver module 83, making little or no changes to the data file. On the other hand, if the mobile device 2 is the destination device or the controller device, it will receive incoming data on one or both of the transceiver modules 81, 83. Namely, a first portion of the data file will be received on the first transceiver module 81 and a second portion of the data will be received on the transceiver module 83. These two portions of the data file will be sent by the processor to the memory 86 under instructions from the app 4 and, based on the instructions from the server or contained in the data itself, will reassemble the data file into a single, complete data file. The data file would then be stored in the memory 86 as a single, complete data file as if the entire data file had been transmitted in the first instance to only the single mobile device 2. In this embodiment, the mobile device 2 may then become the presentation device and output from its memory 86 the entire data which it has assembled based on receiving parts from other local mobile devices.

In the embodiment in which the data file being viewed is a streaming video of a live TV broadcast, this is often transmitted in packet form. In the example in which there are three mobile phones which are coupled to each other over a local communication link via the second transceiver 83, the server application 12 will break the live data stream into packets which are then sorted into parts. The first, second and third packets are all sent simultaneously to the first, second and third mobile devices. Thus, the first mobile device receives the first packet at the very same time the second mobile devices receives the second packet at the same time the third mobile devices receives the third packet. These packets are then sent to one of the central mobile devices, and even though they were received simultaneously at each of the respective mobile devices 2a-2c, they are reassembled on the destination mobile device to be in the proper sequence of packets 1, 2 and 3. Subsequent to sending packet 1 to the first mobile device, the server will then send packet 4 to the same mobile device and then packet 5 to the mobile device which received packet 2 and packet 6 to the mobile device that received packet 3. Therefore, each mobile device in the network only receives 1/x of the packets of the total data file in which x represents the number of mobile devices to which it is locally connected from which it can obtain the remaining packets of the data. Thus, data which is designed to be presented in series on the destination mobile device is translated in parallel simultaneously to a plurality of mobile devices. After it is received simultaneously to a plurality of mobile devices, it is then transferred to a single destination device, at which location it is reassembled in to the correct sequence for the data file and stored in a memory of the destination devices or similar acceptable location. Thus, the sequence in which it is sent to each individual device is not important so long as all of the devices together receive all of the data at a sufficient rate that it can be assembled in the destination device in the correct sequence by receiving, in parallel, the other portions of the data from the other mobile devices 2.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a plurality of mobile communication devices, each one having a first data communication link that is on an RF mobile communications network and a second data communication link that is part of a local communications path directly with another of the mobile communication devices of the plurality;
a server communicating with the RF mobile communications network and configured to send and receive data from each of the plurality of mobile communication devices;
a processing module on a controller mobile communication device of the plurality of mobile communication devices configured to:
identify at least one other mobile communication device of the plurality of mobile communication devices that is in direct communication with the controller mobile communication device on the local communications path,
determine an available bandwidth of the first data communication link for the controller mobile communication device,
receive a request for data from one of the plurality of mobile communication devices,
determine the available bandwidth for each of the at least one other mobile communication device,
send the request for data to the server along with a size of each portion of the data to be sent from the server to each corresponding mobile communication device of the plurality of mobile communication devices, wherein the size of each portion of the data is based on the available bandwidth of each corresponding mobile communication device,
receive a portion of the data from the server, and
provide the portion of the received data to one of the plurality of mobile communication devices combining with at least one other portion of the data by the one of the plurality of mobile communication devices such that the combined data is in the same sequence it was on the server;
a processing module on each of the at least one other mobile communication device configured to:
receive another portion of the data from the server, and
provide the other portion of the received data to the one of the plurality of mobile communication devices combining by the one of the plurality of mobile communication devices such that the combined data is in the same sequence it was on the server; and
a processing module on the server configured to:
receive the request for data from the controller mobile communication devices,
divide a first part of the data into first portions to be sent to the plurality of mobile communication devices, where a size of each first portion is based on the received size of each portion,
send the first data portions to each corresponding mobile communication device of the plurality of mobile communication devices,
determine a size adjustment for each portion of a second part of the data based on a time it takes for each of the first data portions to be received by each corresponding mobile communication device,
divide the second part of the data into second portions to be sent to the plurality of mobile communication devices based the determined size adjustment, and
send the second data portions to each corresponding mobile communication device of the plurality of mobile communication devices.

2. The system of claim 1 wherein the second data communication link further comprises a Wi-Fi connection.

3. The system of claim 1 wherein the second data communication link further comprises a Bluetooth connection.

4. The system of claim 1 wherein the second data communication link further comprises an Infrared connection.

5. The system of claim 1 wherein the second data communication link further comprises a USB connection.

6. The system of claim 1 wherein divide the data into portions to be sent to the plurality of mobile communication devices further comprises:
determine a current bandwidth for the first data communication links for each of the plurality of mobile communication devices; and
separate the data into portions, the number of portions corresponding to the number of first data communication links for the plurality of mobile communication devices, where the received size of each portion is adjusted in proportion to the current bandwidth of the respective first data communication link for each of the plurality of mobile communication devices in relation to the total current bandwidth for all of the plurality of mobile communication devices.

7. A mobile device, comprising:
a display;
a processor;
a first data communication path connected to a mobile cellular data communications network;
a second data communication path connected to a local data communications network;
wherein the processor is configured to:
determine a current bandwidth of the first data communication path;
receive another current bandwidth from one or more other mobile devices over the second data communication path;
send a request for data to a server, the request includes a size of each respective portion of the data to be sent to each respective mobile device including the mobile device and the one or more other mobile devices, wherein the size of each respective portion of the data is based on the current bandwidth of each respective mobile device such that the server separates the data into a first portion and at least one other portion to be sent to each respective mobile device over the mobile cellular data communications network based on the size of each respective portion and adjusts the size of the first portion and the at least one other portion based on a signal strength of each respective mobile device over the mobile cellular data communications network;
receive the first portion of data from the server over the first data communication path;

receive the at least one other portion of the data from the one or more other mobile devices over the second data communication path;

combine the received first portion of the data from the first data communication path and the received at least one other portion of the data from the second data communication path such that the combined data is in the same sequence it was on the server; and present the data on the display.

8. The device according to claim 7 wherein data comprises streamed video content.

9. The device according to claim 7 wherein the second data communication path further comprises a Wi-Fi connection.

10. The device according to claim 7 wherein the second data communication path further comprises a Bluetooth connection.

11. The device according to claim 7 wherein the second data communication path further comprises a USB connection.

12. A method, comprising:

identifying a plurality of mobile communication devices, each one having a first data communication link that is on an RF mobile communications network and a second data communication link that is part of a local communications path directly with another of the mobile communication devices of the plurality;

receiving a request for data at a server from a first mobile communication device of the plurality of mobile communication devices, wherein the request includes a size of each portion of the data to be sent to each respective mobile communication device of the plurality of mobile communication devices, the size of each portion being based on an available bandwidth of each respective mobile communication device;

dividing a first part of the data into first portions to be sent to each respective mobile communication device of the plurality of mobile communication devices based on the received size of each respective portion;

sending the first data portions through the first data communication link to each of the plurality of mobile communication devices such that each of the plurality of mobile communication devices forwards the first data portions over the second data communication link to a second mobile communication device of the plurality of mobile communication devices to be combined by the second mobile communication device such that the combined data is in the same sequence it was on the server;

dividing a second part of the data into second portions to be sent to each respective mobile communication device based on a time it takes for each respective mobile communication device to receive the first data portions; and sending the second data portions through the first data communication link to each of the plurality of mobile communication devices, such that each of the plurality of mobile communication devices forwards the second data portions over the second data communication link to the second mobile communication device to be combined by the second mobile communication device such that the combined data is in the same sequence it was on the server.

13. The method of claim 12, wherein dividing the data into portions to be sent to the plurality of mobile communication devices further comprises:

determining a current bandwidth for the first data communication links for each of the plurality of mobile communication devices; and separating the data into portions, the number of portions corresponding to the number of first data communication links for the plurality of mobile communication devices, where the received size of each portion is adjusted in proportion to the current bandwidth of the respective first data communication link for each of the plurality of mobile communication devices in relation to the total current bandwidth for all of the plurality of mobile communication devices.

14. The method of claim 12, wherein the request from the first mobile communication device identifies the plurality of mobile communication devices.

15. The method of claim 12, wherein the data comprises streaming video content.

16. A system, comprising:

a server;

a first mobile device; and a second mobile device;

wherein the first mobile device includes:

a first network interface that communicates with the server via a first network;

a second network interface that communicates with the second mobile device via a second network, the second network being separate from the first network;

a memory that stores first instructions; and a processor that executes the first instructions to perform actions, the actions including:

determining a bandwidth available to each of the first mobile device and the second mobile device over the first network;

receiving a request for data maintained by the server;

determining a size of each portion of the data to be sent from the server to each respective mobile device of the first mobile device and the second mobile device, the size of each portion of the data is determined based on the available bandwidth of each respective mobile device;

sending the request to the server along with the size of each portion of the data to be sent from the server to each respective mobile device;

receiving a first portion of the data from the server via the first network;

receiving a second portion of the data from the second mobile device via the second network; and combining the first portion of the data with the second portion of the data for display to at least a user of the first mobile device;

wherein the second mobile device includes:

a first network interface that communicates with the server via the first network;

a second network interface that communicates with the first mobile device via the second network;

a memory that stores second instructions; and a processor that executes the second instructions to perform actions, the actions including:

receiving the second portion of the data from the server via the first network, and providing the second portion of the data to the first mobile device via the second network; and wherein the server includes:

a network interface that communicates with the first and second mobile devices via the first network;

a memory that stores third instructions; and a processor that executes the third instructions to perform actions, the actions including:
  receiving the request for data with the size of each portion of the data from the first mobile device via the first network,
  separating the data into the first and second portions based on the received size of each portion,
  adjusting a size of the first and second portions based on a signal strength of the first and second mobile devices over the first network; and
  sending the first portion of the data to the first mobile device via the first network and the second portion of the data to the second mobile device via the first network.

* * * * *